United States Patent
Moennich et al.

(10) Patent No.: US 10,836,380 B2
(45) Date of Patent: Nov. 17, 2020

(54) SAFETY DEVICE FOR A VEHICLE

(71) Applicant: Robert Bosch GmbH, Stuttgart (DE)

(72) Inventors: Joerg Moennich, Stuttgart (DE); Thomas Lieh, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 15/753,582

(22) PCT Filed: Jun. 9, 2016

(86) PCT No.: PCT/EP2016/063175
§ 371 (c)(1),
(2) Date: Feb. 20, 2018

(87) PCT Pub. No.: WO2017/028978
PCT Pub. Date: Feb. 23, 2017

(65) Prior Publication Data
US 2019/0001969 A1    Jan. 3, 2019

(30) Foreign Application Priority Data

Aug. 18, 2015  (DE) .................. 10 2015 215 674

(51) Int. Cl.
*B60W 30/085* (2012.01)
*B60W 10/20* (2006.01)
(Continued)

(52) U.S. Cl.
CPC ....... *B60W 30/085* (2013.01); *B60R 21/0134* (2013.01); *B60W 10/184* (2013.01);
(Continued)

(58) Field of Classification Search
CPC ....... B60R 21/00; B60R 21/01; B60R 21/013; B60R 21/0134; B60W 10/00;
(Continued)

(56) References Cited

U.S. PATENT DOCUMENTS

| 6,359,553 | B1* | 3/2002 | Kopischke ............ B60Q 9/008 180/169 |
| 2010/0023224 | A1* | 1/2010 | Stabrey ............... B60T 8/17551 701/45 |
| 2015/0066307 | A1* | 3/2015 | Bugelli ............... B60R 21/0132 701/45 |

FOREIGN PATENT DOCUMENTS

| CN | 102032883 A | 4/2011 |
| CN | 103072575 A | 5/2013 |

(Continued)

OTHER PUBLICATIONS

International Search Report dated Sep. 16, 2016 of the corresponding International Application PCT/EP2016/063175 filed Jun. 9, 2016.

*Primary Examiner* — Charles J Han
(74) *Attorney, Agent, or Firm* — Norton Rose Fulbright US LLP; Gerard Messina

(57) ABSTRACT

A safety device for a vehicle includes a sensor system and an evaluation and control unit that is coupled to the sensor system via an interface and that evaluates information from the sensor system in order to detect objects in the area ahead of the vehicle, calculates, on the basis of the information from the sensor system, a likely impact point of a detected object and/or a likely amount of overlap of the detected object and the vehicle, brings the vehicle into a defined slide-off position by way of a targeted intervention into the vehicle dynamics when the calculated likely impact point and/or the calculated amount of overlap satisfies at least one predefined condition.

5 Claims, 2 Drawing Sheets

(51) Int. Cl.
*B60W 10/184* (2012.01)
*B60R 21/0134* (2006.01)

(52) U.S. Cl.
CPC ......... *B60W 10/20* (2013.01); *B60W 2554/00* (2020.02); *B60W 2710/18* (2013.01); *B60W 2710/22* (2013.01); *B60W 2710/30* (2013.01); *B60W 2720/20* (2013.01)

(58) Field of Classification Search
CPC .... B60W 10/18; B60W 10/184; B60W 10/20; B60W 2550/00; B60W 2550/10; B60W 2710/00; B60W 2710/18; B60W 2710/22; B60W 2710/30; B60W 2720/00; B60W 2720/20; B60W 30/00; B60W 30/08; B60W 30/085
See application file for complete search history.

(56) References Cited

FOREIGN PATENT DOCUMENTS

| | | | |
|---|---|---|---|
| DE | 19532858 A1 | 2/1997 | |
| DE | 10113098 A1 | 9/2002 | |
| DE | 10233575 A1 | 2/2004 | |
| DE | 102004036332 A1 | 3/2006 | |
| DE | 102014111819 A1 | 3/2015 | |
| EP | 0967121 A2 | 12/1999 | |
| WO | WO-2004016477 A1 * | 2/2004 | ........... B60R 21/013 |
| WO | 2005/110815 A1 | 11/2005 | |
| WO | 2006/045259 A1 | 5/2006 | |

* cited by examiner

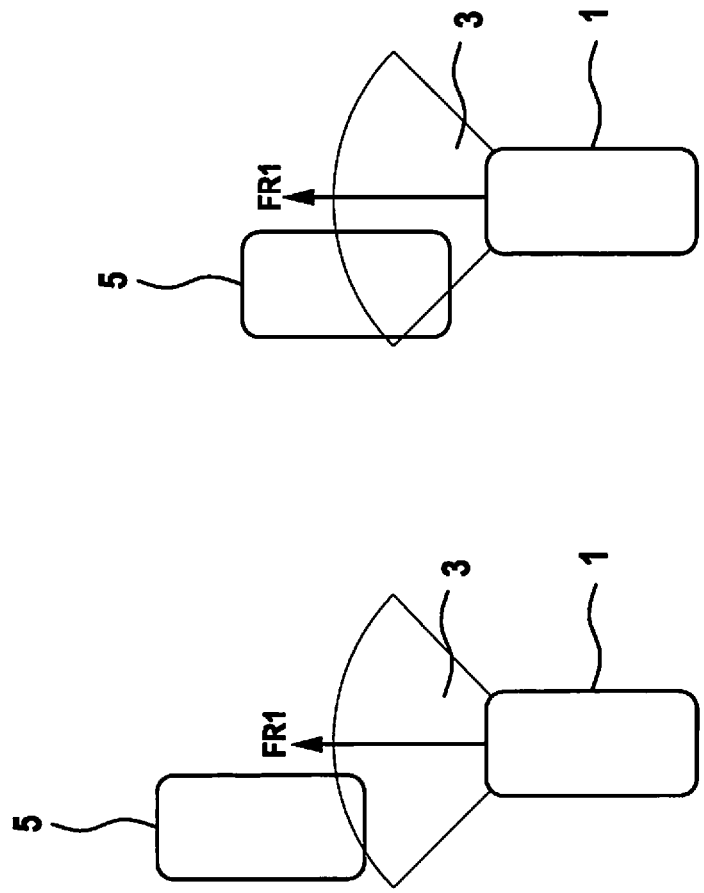
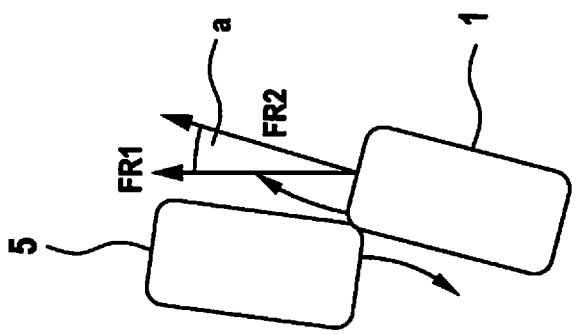
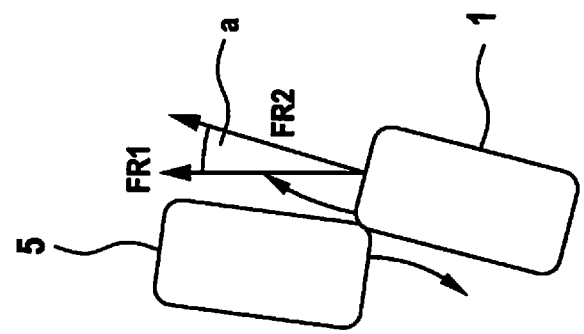

SAFETY DEVICE FOR A VEHICLE

CROSS-REFERENCE TO RELATED APPLICATIONS

The present application is the national stage of International Pat. App. No. PCT/EP2016/063175 filed Jun. 9, 2016, and claims priority under 35 U.S.C. § 119 to DE 10 2015 215 674.5, filed in the Federal Republic of Germany on Aug. 18, 2015, the content of each of which are incorporated herein by reference in their entireties.

FIELD OF THE INVENTION

The present invention relates to a safety device for a vehicle.

BACKGROUND

Certain structural constructions (crash structures) on the vehicle are known from the related art, which distribute the forces occurring during a head-on collision in a way which is preferably favorable for the occupants. Assistance systems for vehicles are also known, which, in the case of an imminent head-on collision, warn the driver and output a prompt to brake or steer. In addition, assistance systems for vehicles are known, which automatically brake, steer, and/or carry out an evasive maneuver.

In order to increase the occupant protection in the case of moderately overlapping head-on collisions, the most frequent causes of which are failing to notice and/or not paying attention to the oncoming traffic and/or an erroneous stopping behavior, passive protection systems, such as, for example, specially designed crash boxes, are known from the related art, which are used to mitigate the consequences of an accident in the case of partially overlapping collisions.

DE 195 32 858 A1 describes, for example, a solid safety bumper for passenger cars, which is designed as a structural, non-deformable component and transfers forces occurring in a head-on collision into a deformation area of the vehicle. In addition, the safety bumper includes a smooth surface which supports a slide-off effect in the case of a moderately overlapping head-on collision.

A method is known from DE 101 13 098 A1, which provides for a wheel deflection on the affected vehicle side in the case of a moderately overlapping head-on collision, so that a sliding collision is to be forcibly induced. In this case, shortly before the collision, a wheel pivoting of the front wheel is effectuated, e.g., hydraulically or pyrotechnically, using an actuator in the steering link. As a result, the outer side of the wheel rim is to function as a slide-off plane and prevent the colliding vehicles from interlocking.

WO 2005/110815 A1 describes a deflector device for the case of a partially overlapping head-on collision for motor vehicles, the front ends of which include a left longitudinal beam and a right longitudinal beam. The deflector device is based on a fold-out mechanism in front of the particular front wheel and is intended to prevent the tires from interlocking and, therefore, promote a sliding collision.

SUMMARY

An advantage of a safety device for a vehicle according to example embodiments of the present invention is that an additional and complex intervention into the vehicle structure is not required in order to increase the occupant protection in the case of moderately overlapping head-on collisions. As a result, an increase in the costs and/or the weight can be advantageously avoided. Due to the targeted intervention into the vehicle dynamics, for example by way of activating braking or steering components, an imminent moderately overlapping head-on collision can be advantageously reduced to a less severe sliding collision and, subsequent to the sliding collision, the vehicle can be stabilized and/or decelerated.

It is generally known from accident analyses that, in the case of sliding collisions, i.e., very slightly overlapping collisions with a lateral slide-off, lesser consequences of injury can result than in the case of moderately overlapping head-on collisions, in which the collision parties become interlocked and subsequently develop a strong rotary motion. The reason is that, first and foremost, in the case of a moderate overlap, the crash structures of the collision parties are not optimally loaded and, when the collision parties become interlocked, there is a high risk of intrusion, for example by the front tires, into the passenger compartment. In addition, a greater load on the occupant compartment can occur in such cases, due to unfavorable blockings, such as, for example, a wheel on a sill. In contrast thereto, the structural damages and intrusions and, therefore, the direct consequences of collision and injury are lower in the case of a sliding collision. In such cases, the accident energy can be dissipated with the aid of a braking system which is usually still functioning. Moreover, strong uncontrolled rotations and possible sideways motions of the collision parties can be avoided and the host vehicle can be stabilized.

Specific embodiments of the present invention detect, with the aid of sensors, a possible head-on collision with a highly likely moderate overlap and influence the vehicle dynamics, preferably with the aid of targeted brake and/or steering interventions, in such a way that a slide-off of the collision parties is supported. In the best possible case, the head-on collision can be entirely avoided.

Specific embodiments of the present invention provide a safety device for a vehicle including a sensor system and an evaluation and control unit which is coupled to the sensor system via at least one interface and evaluates information from the sensor system in order to detect objects in the area ahead of the vehicle. In this case, the evaluation and control unit calculates, on the basis of the information from the sensor system, a likely impact point of a detected object and/or a likely overlap of the detected object and the vehicle, the evaluation and control unit bringing the vehicle into a defined slide-off position by way of a targeted intervention into the vehicle dynamics when the calculated likely impact point and/or the calculated overlap meet/meets at least one predefined condition.

The influence area within the vehicle front area is relatively small in the case of a likely moderately overlapping head-on collision and extends from one edge of the vehicle up to the corresponding longitudinal beam. Therefore, the likely moderately overlapping head-on collision can be transferred into a sliding collision by changing the direction of travel of the vehicle by only a few centimeters or by only a few angular degrees, or by reorienting the vehicle. These are preconditions which are considerably easier to handle than is the case with an avoidance assistant.

The evaluation and control unit can be understood to be, in the present case, an electrical device, such as, for example, a control unit, in particular an airbag control unit, which processes and evaluates detected sensor signals. The evaluation and control unit can include at least one interface which can be designed in the form of hardware and/or software. In the case of an embodiment as hardware, the interfaces can be part of a so-called system ASIC, for example, which contains highly diverse functions of the evaluation and control unit. It is also possible, however, that the interfaces are standalone, integrated circuits or are formed, at least in part, from discrete components. In the case of an embodiment as software, the interfaces can be software modules, which are present, for example, on a microcontroller in addition to other software modules. In addition, a computer program product including program code is advantageous, which is stored on a machine-readable carrier such as a semiconductor memory, a hard drive memory or an optical memory, and which is used for carrying out the evaluation when the program is carried out by the evaluation and control unit.

A sensor system, in the present application, is understood to be a component which includes at least one sensor element which directly or indirectly detects a physical variable or a change in a physical variable and preferably converts it into an electrical sensor signal. This can take place, for example, via the transmission and/or the reception of sound and/or electromagnetic waves and/or via a magnetic field or the change in a magnetic field and/or via the reception of satellite signals, for example, a GPS signal.

Optical sensor elements are also possible, which include, for example, a photographic plate, a fluorescent surface, and/or a semiconductor, which detects the impact, intensity, wavelength, frequency, angle, etc., of the received wave, such as, for example, infrared sensor elements. An acoustic sensor element is likewise conceivable, such as, for example, an ultrasonic sensor element and/or a high frequency sensor element and/or a radar sensor element and/or a sensor element which responds to a magnetic field, such as, for example, a Hall sensor element and/or a magnetoresistive sensor element and/or an inductive sensor element, which registers the change in a magnetic field, for example via the voltage generated by way of magnetic induction. The ascertainment of the sensor signals can take place statically and/or dynamically. Moreover, the ascertainment of the sensor signals can be carried out one time or continuously.

The ascertained sensor signals are evaluated, for example, by an evaluation unit integrated in the sensor system and are converted into sensor data which include a physical variable ascertained from a physical variable detected using the particular sensor unit, including the associated unit. Alternatively, the functionality of the evaluation unit can be integrated into the evaluation and control unit. In this case, the change in travel in a certain time window is ascertained, for example by way of a sensor element, and, on the basis thereof, a speed and/or an acceleration and/or a distance is calculated by the evaluation unit. Further calculable physical variables are mass, rpm, force, energy, and/or other conceivable variables, such as, for example, a probability of occurrence for a certain event, such as a moderately overlapping head-on collision.

The sensor system can be designed, for example, in such a way that only the influence area within the vehicle front area from the edge of the vehicle up to the corresponding longitudinal beam, i.e., only the close range to the left and to the right of the vehicle front, is monitored. Since the effective range relates only to the outer edges of the vehicle front, the detection range of the sensors of the sensor system can be correspondingly limited.

If the evaluation and control unit detects, by evaluating the sensor signals, an imminent head-on collision, the evaluation and control unit checks and calculates the probability of a moderately overlapping head-on collision to the right or to the left of the vehicle front and determines the likely impact point or the amount of overlap. If the distance of the expected impact point to the edge of the vehicle or the expected amount of overlap as viewed from the edge of the vehicle is very small, the evaluation and control unit can influence the collision in such a way that it is highly likely that the object will slide off.

It is particularly advantageous that the evaluation and control unit intervene in a braking system and/or a steering system of the vehicle in order to influence the vehicle dynamics. In this way, the evaluation and control unit can activate the braking system and/or the steering system, for example shortly before or during the collision, in such a way that the vehicle pivots in a manner which is favorable for sliding off. The braking system can be activated in such a way, for example, that the vehicle is braked on one side, in order to achieve a desired vehicle orientation. Alternatively or additionally, steering impulses for the targeted vehicle orientation can be generated by way of the automatic activation of the steering system.

In one advantageous embodiment of the safety device, the at least one predefined condition can represent a threshold value for a distance of the likely impact point from the corresponding lateral edge of the vehicle. The evaluation and control unit can influence the vehicle dynamics, for example, when the distance of the likely impact point falls below a predefined first threshold value. Additionally or alternatively, the at least one predefined condition can represent a threshold value for the likely amount of overlap. The evaluation and control unit can influence the vehicle dynamics, for example, when the likely amount of overlap falls below a predefined second threshold value. In summary, the evaluation and control unit can check or calculate the probability of a moderately overlapping head-on collision to the right or to the left of the vehicle front and determine the likely impact point or the amount of overlap when the evaluation and control unit detects an imminent head-on collision by evaluating the sensor signals. If the distance of the expected impact point to the edge of the vehicle or the expected amount of overlap as viewed from the edge of the vehicle is less than the corresponding predefined threshold value, the evaluation and control unit can influence the collision in such a way that it is highly likely that the object will slide off.

In yet another advantageous embodiment of the safety device, the slide-off position can be defined by an angular range which is predefined via the original vehicle orientation and the new vehicle orientation. The angular range can be preferably limited by a predefined maximum value. As a result, severe lateral collisions can be advantageously avoided.

In yet another advantageous embodiment of the safety device, the evaluation and control unit can activate passive occupant protection systems and/or braking functions and/or warning units. In this way, for example, a window air bag can be activated upon detection of a sliding collision, in order to protect the occupants from flying glass splinters. In addition, after the vehicle has been oriented into the defined slide-off position, further safety functions, such as, for example, braking to a standstill, warning flashers, restraint means such as airbags, seat belt tighteners, etc., can be activated as necessary and an automatic emergency call can be transmitted.

In yet another advantageous embodiment of the safety device, reinforcements can be provided in the lateral front area of the vehicle, in order to improve the slide-off behavior of the vehicle and mitigate possible consequences of the sliding collision.

One exemplary embodiment of the present invention is represented in the drawings and is explained in greater detail in the following description. In the drawings, the same reference numerals label components or elements which carry out identical or similar functions.

BRIEF DESCRIPTION OF THE DRAWINGS

FIG. 2 shows a schematic representation of likely collision parties of a head-on collision.

FIG. 3 shows a schematic representation of the collision parties during the detection of a likely moderately overlapping head-on collision according to an example embodiment of the present invention.

FIG. 4 shows a schematic representation of the collision parties during a sliding collision.

DETAILED DESCRIPTION

Figure 1:
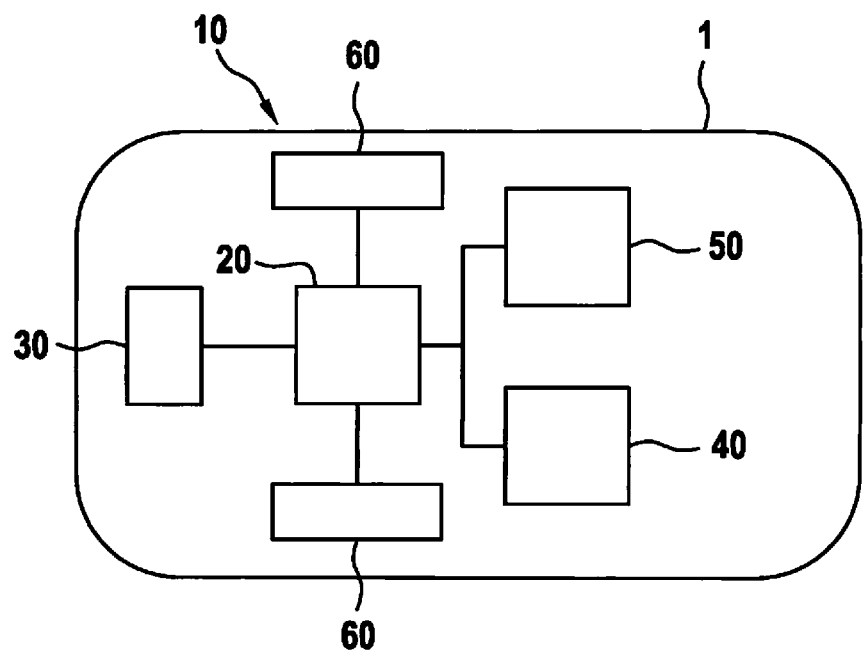
FIG. 1 shows a schematic block diagram of a vehicle including a safety device according to an example embodiment of the present invention.

As is apparent in FIGS. 1 through 4, the represented safety device 10 according to an example embodiment of the present invention for a vehicle 1 includes a sensor system 30 and an evaluation and control unit 20 that is coupled to sensor system 30 via at least one interface and that evaluates information from sensor system 30 in order to detect objects in the area ahead of the vehicle. In this case, evaluation and control unit 20 calculates, on the basis of the information from sensor system 30, a likely impact point of a detected object 5 and/or a likely amount of overlap of detected object 5 and vehicle 1. Evaluation and control unit 20 brings vehicle 1 into a defined slide-off position by way of a targeted intervention into the vehicle dynamics when the calculated likely impact point and/or the calculated amount of overlap meet/meets at least one predefined condition. As a result, possible consequences of the moderately overlapping head-on collision can be advantageously mitigated by way of the transfer into a sliding collision.

In the exemplary embodiment shown, object 5 or the likely collision party is an oncoming other vehicle. Alternatively, the likely collision party can also be a stationary object, such as, for example, a tree, or a preceding slow vehicle, or another mobile object.

In the exemplary embodiment shown, at least one sensor or sensor element of sensor system 30 detects a possible collision when oncoming object 5 enters a monitoring area or sensor area 3 of sensor system 30. This state is represented in FIG. 2.

Evaluation and control unit 20 calculates, on the basis of information from sensor system 30, the likely impact point of detected object 5 and/or the likely amount of overlap of detected object 5. Evaluation and control unit 20 detects a likely moderately overlapping head-on collision when the calculated likely impact point and/or the calculated amount of overlap meet/meets the at least one predefined condition. This state is represented in FIG. 3. In the exemplary embodiment shown, the at least one predefined condition represents a threshold value for a distance of the likely impact point from the corresponding lateral edge of vehicle 1. Evaluation and control unit 20 therefore influences the vehicle dynamics of vehicle 1 when the distance of the likely impact point falls below a predefined first threshold value. Additionally or alternatively, the at least one predefined condition can represent a threshold value for the likely amount of overlap. In this case, evaluation and control unit 20 influences the vehicle dynamics when the likely amount of overlap falls below a predefined second threshold value.

In the exemplary embodiment shown, evaluation and control unit 20 intervenes in a braking system 40 and/or a steering system 50 of vehicle 1 in order to influence the vehicle dynamics. In this way, evaluation and control unit 20 can brake individual vehicle wheels in a targeted manner via the intervention into braking system 40 and therefore, by way of such a one-sided or intermittent braking operation, generate a desired yawing moment about the vehicle vertical axis and achieve a desired orientation of vehicle 1, which is represented in FIG. 4. Additionally or alternatively, evaluation and control unit 20 can generate targeted steering impulses by way of the intervention into steering system 50, in order to achieve the desired orientation of vehicle 1, which is represented in FIG. 4. This means that, in the case of a detected likely moderately overlapping head-on collision, in the exemplary embodiment shown, evaluation and control unit 20 influences the vehicle orientation via targeted brake and/or steering interventions shortly before or during the collision in such a way that a slide-off of the collision opponents is supported. In the best possible case, the collision can be entirely avoided.

As is further apparent in FIG. 4, the slide-off position in the exemplary embodiment shown is defined by an angular range a, defined by original vehicle orientation FR1 and new vehicle orientation FR2. Angular range a is limited by a predefined maximum value which is determined, for example, based on the existing crash structures of vehicle 1 and/or based on the likely impact point and/or the amount of overlap. Due to the limitation of the angular range, severe lateral collisions can be advantageously avoided.

After vehicle 1 has been transferred into the desired slide-off position, evaluation and control unit 20 activates passive occupant protection systems 60 and/or brake functions and/or warning units. In this way, for example, a window airbag of passive occupant protection system 60 can be activated, in order to protect the occupants from glass splinters. In addition, further safety functions, such as, for example, braking to a standstill, warning flashers, restraint means such as airbags, seat belt tighteners, etc., can be activated as necessary and an automatic emergency call may be transmitted.

A favorable design of the lateral front area of vehicle 1 can improve the capability of the vehicle to slide off and can positively supplement safety device 10 according to the present invention. In this way, for example, reinforcements can be installed in the lateral front area of the vehicle. The shifting of the reinforcements into lateral elements, such as fenders, has a positive effect on pedestrian protection and the central installation space.

Specific embodiments of the present invention provide a safety device for a vehicle, which detects an oncoming object with the aid of a suitable sensor system and also determines the possible impact point on the vehicle front and, in the case of a highly likely moderately overlapping head-on collision, brings the vehicle into a "favorable" slide-off position by way of targeted brake and steering interventions and, subsequent to the sliding collision, activates or carries out suitable functions for stabilizing the vehicle. A favorable design of the slide-off area of the vehicle can positively supplement the safety device in this case. Upon detection of a sliding collision, passive occupant protection systems can be suitably activated.

What is claimed is:

1. A safety device for a vehicle, the safety device comprising:
   a sensor system; and
   a control unit coupled to the sensor system via at least one interface, wherein the control unit is configured to:
      predict, based on information from the sensor system, a head-on collision of the vehicle with an object located in an area ahead of the vehicle;
      calculate, based on the information from the sensor system, a predicted amount of overlap of a surface of the object with a surface of the vehicle during the predicted head-on collision of the vehicle with the object;
      compare, by the control unit, (i) the calculated predicted amount of overlap of the surface of the object with the surface of the vehicle, and (ii) a threshold amount;
      determine, by the control unit, that the calculated predicted amount of overlap of the surface of the object with the surface of the vehicle is less than the threshold amount; and
      responsive to the determination, pivot the vehicle by controlling a braking system of the vehicle and/or a steering system of the vehicle, and transferring the vehicle into a defined slide-off position, the defined slide-off position being a new position of the vehicle within a predefined range of angles of an original orientation of the vehicle.

2. The safety device as recited in claim 1, wherein the range is limited by a predefined maximum value.

3. The safety device as recited in claim 1, wherein the transfer of the vehicle to the defined slide-off position reduces the predicted head-on collision to an actual sliding collision of the vehicle and the object.

4. The safety device as recited in claim 1, wherein the transfer of the vehicle to the defined slide-off position reduces the predicted head-on collision to an avoidance of a collision of the vehicle with the object.

5. The safety device as recited in claim 1, wherein the control unit is configured to, in response to the determination, activate: (i) a passive occupant protection system, and/or (ii) a brake function, and/or (iii) a warning unit.

* * * * *